United States Patent [19]
Tremblay et al.

[11] Patent Number: 5,918,037
[45] Date of Patent: Jun. 29, 1999

[54] GENERATING TESTS FOR AN EXTENDED FINITE STATE MACHINE USING DIFFERENT COVERAGE LEVELS FOR DIFFERENT SUBMODELS

[75] Inventors: Sylvia C. Tremblay, Nashua; Ronald A. Kita, Hollis, both of N.H.

[73] Assignee: Teradyne, Inc., Boston, Mass.

[21] Appl. No.: 08/658,344

[22] Filed: Jun. 5, 1996

[51] Int. Cl.⁶ .............................. G06F 17/00; G06F 17/50
[52] U.S. Cl. ........................................................ 395/500.03
[58] Field of Search ..................................... 364/488–491, 364/578, 579, 580; 371/22.1; 395/140, 500

[56] References Cited

U.S. PATENT DOCUMENTS

| | | | |
|---|---|---|---|
| 5,038,307 | 8/1991 | Krishnakumr et al. | 364/578 |
| 5,394,347 | 2/1995 | Kita et al. | 364/578 |
| 5,408,597 | 4/1995 | Kita et al. | 395/140 |
| 5,513,122 | 4/1996 | Cheng et al. | 364/489 |
| 5,623,499 | 4/1997 | Ko et al. | 371/22.1 |

OTHER PUBLICATIONS

Hutchins et al. "Experiments on the Effectiveness of Dataflow and Controlflow–Based Test Adequacy Criteria," IEEE, pp. 191–200.

*Automating the Test Generation Process*, by Larry Apfelbaum, pp. 1–12, May 95'.

*TestMaster –Automating Software Quality*, Teradyne Software and Systems Test, 1994, 5 pages plus brochure.

*Positive Results at Cadence Design Systems Using Model Reference Testing Approach*, by Michael D. Sowers, Teradyne Software and Systems Test, 1 page, No date.

*Primary Examiner*—Kevin J. Teska
*Assistant Examiner*—Vuthe Siek
*Attorney, Agent, or Firm*—Edmund J. Walsh

[57] ABSTRACT

An automatic test generation system in which the coverage levels of the tests can be controlled to tradeoff between the extent of the test conducted and the length of time required to execute the test. The system under test is modeled as an extended finite state machine made up of interconnected models. The coverage level of each model can be controlled to avoid generating paths that differ only be edges within certain models if those differing edges are already included in other paths. The coverage level for each model can be set automatically through a process which computes the effect on the total number of paths generated when the coverage level of selected models is varied.

15 Claims, 7 Drawing Sheets

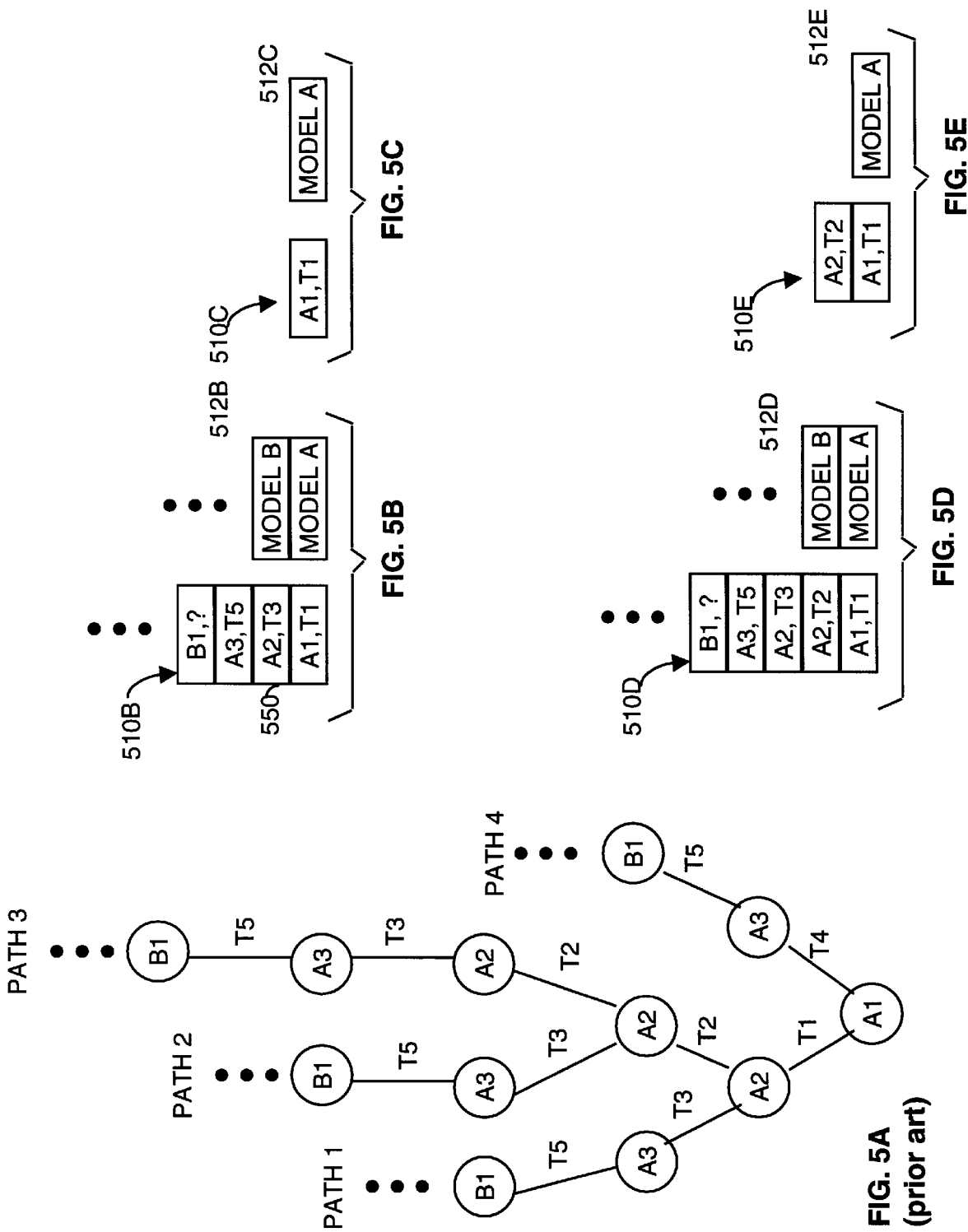

GENERATING TESTS FOR AN EXTENDED FINITE STATE MACHINE USING DIFFERENT COVERAGE LEVELS FOR DIFFERENT SUBMODELS

This invention relates generally to automatic test generation and more specifically to controlling the coverage level of the tests generated.

U.S. Pat. No. 5,394,347 to Kita et al., U.S. Pat. No. 5,408,597 and pending U.S. applications Ser. No. 08/100, 006 entitled "Method and Apparatus For Testing Implementations Of Software Specifications now abandoned", 08/100, 005 "Method And Apparatus For Transforming A Specification Into An Extended Finite State Machine", now abandoned and 08/100,007 "Method And Apparatus For Schematic Panning", now abandoned, collectively describe a system for automatically generating test programs for systems, such as computer software. The above mentioned patents and patent applications are hereby incorporated by reference.

Many of the features described in those patents are incorporated into a product sold by Teradyne Software and System Test, Inc. of Nashua, NH, USA under the tradesman TESTMASTER™. TESTMASTER generates test suites to test software, such as graphical user interfaces and represents a major advancement in the art of software development.

TESTMASTER generates a test suite for a particular piece of software under test. To generate the test suite, the software under test is first modeled as an extended finite state machine. The model contains states and transitions between the states. The transitions are also called "edges." The model also includes information specifying when a certain transition is to be taken and the effect of taking a transition.

The automated test system can greatly reduce the time required to generate the test suite or test protocols. A human programmer does not need to write the test programs. Rather, the human programmer uses the TESTMASTER tools to input the model of the software or system under test. TESTMASTER then generates test programs which test all paths through the program or system under test. Each paths through the program is tested by a test program. The collection of all the test programs makes up a test suite.

The test suite can be run to test the software or system under test as it is being developed. For example, the automatically generated test suite might be repeated as changes are made to the software under test to verify that changes made during development of one area of the software under test have not disrupted operation of a different area of the software under test.

One drawback of generating a test suite automatically is that it is possible to generate more test programs in the suite than can be conveniently executed in a reasonable period of time. If the test generator is operated in an "all paths" mode, there will be one test program for each possible permutation of the transitions between the beginning state and ending state of the model. For example, if a software program contains a procedure which can be called at ten points in the program, using an "all paths" setting will result in a suit with test programs that call that procedure from all ten points and exhaust all permutation of the paths within the procedure at each point.

To reduce the number of test programs in the test suite, the TESTMASTER test system has features to limit the number of test cases generated. For example, if the software under test contains a loop which might be executed an indeterminate number of times, the test generator has mechanisms to limit these cycles.

The total number of test programs generated can also be reduced by setting the coverage level for the model. A feature of TESTMASTER test generator is the ability of a user to specify that only enough tests be generated to exercise each transition within the software under test once. This is termed "transition cover" testing.

Transition cover testing is equivalent to a complete functional test of the software under test. It often results in many fewer test cases than an all paths testing. For example, if a program contains a procedure that is called at ten places in the program, "transition cover" might generate a test suite which tests all the transitions through the procedure for only one of the calls. At the other calls, only enough transitions would be included to connect to other transitions outside the procedure. The generated test suite can be executed more quickly than a test suite generated with an all paths coverage level, but will sometimes not detect all faults.

The TESTMASTER test generator can be operated to generate tests with a greater level of detail than transition cover testing but less detail than all paths testing. In particular, each transition can have a constraint associated with it. The constraint dictates whether the transition should be traced out as a particular test is being generated. By adjusting the predicates to restrict the number of times a particular transition is included in different tests, the total number of tests generated can be reduced. The difficulty with this approach is that it can be time consuming and requires a significant amount of expert human intervention to determine which transitions should be given constraints without impacting the quality of the test suite.

SUMMARY OF THE INVENTION

With the foregoing background in mind, it is an object of the invention to provide a test generator that generates test suites for a system in variable levels of test coverage.

It is also an object to automate the selection of appropriate test selection coverage.

The foregoing and other objects are achieved with a test generator that generates test based on an architecture for a system under test. Portions of the architecture can be designated as having a higher coverage level and portions can be designated as having a lower coverage level.

In one embodiment, a multi-pass tool is provided to automate the selection of portions of the architecture to be set to the higher coverage level. In the first pass, high path portions of the architecture defining the system under test are identified. In a subsequent pass, the number of tests generated for each combination of coverage level of the high path portions is determined. A combination is selected and the tests are generated with the selected combination of coverage levels.

In a preferred embodiment, the system under test is specified as an extended finite state machine architecture made up of a plurality of models. Each model contains a set of interconnected edges. The higher coverage level comprises tests that include every path through the architecture. The lower coverage level comprises a set of test in which each edge is incorporated in at least one test. The first pass determines a baseline number of tests generated using the lower coverage level for all models. Deviations from the baseline are determined when higher coverage level is used for one model at a time. If the deviation for any model exceeds a threshold, that model is identified as a high path portion of the architecture.

In one embodiment, multiple calls of the same model might occur as paths through the extended finite state machine architecture are traced. The coverage level for each call can be varied.

BRIEF DESCRIPTION OF THE DRAWINGS

The invention will be better understood by reference to the following more detailed description and accompanying drawings in which

FIG. 5A is a tree diagram useful in visualizing paths through the EFSMA;

FIGS. 5B–5E are sketches illustrating contents of computer memory at various points in the path generation process.

DESCRIPTION OF THE PREFERRED EMBODIMENT

Figure 1A:
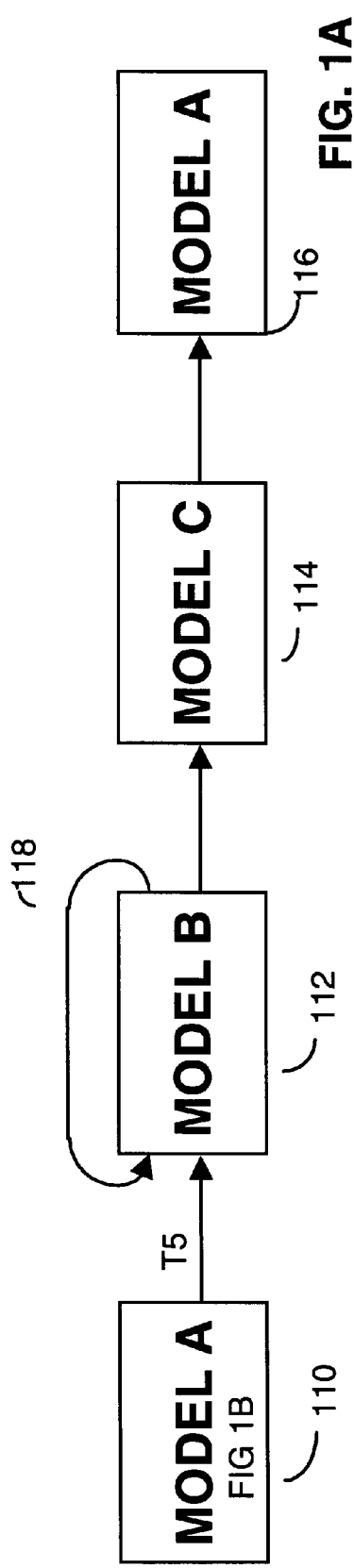
FIG. 1A is a greatly simplified block diagram of an extended finite state machine architecture representing a system under test.

FIG. 1A illustrates an extended finite state machine architecture (EFSMA) such as might be used to model a system under test. EFSMA are described in the above mentioned U.S. Pat. No. 5,394,347 and other patents and applications listed above. The EFSMA representation of a system under test is developed in accordance with the techniques described in U.S. Pat. No. 5,394,347 and other documents mentioned above.

As is described in that patent, a test for the system is generated in a computerized system by first determining a set of paths through the EFSMA. Each path in the set is converted to a test by associating a test statement with transitions in the path. Thus, the number of tests generated for the system depends on the number of paths traced through the EFSMA.

FIG. 1A shows a relatively simple EFSMA with just three models. Models A, B and C are illustrated, with Model A appearing twice at 110 and 116. Each time model A appears in the EFSMA, it is referred to as a "call" of that model. For example, if the EFSMA represents a computer program, Model A might represent a subprogram that is called from two different places in the program.

Even for a relatively simple EFSMA, numerous paths might be generated in an all paths coverage because there are numerous paths through each model. In addition, there is a loop that includes Model B such that Model B might be traversed multiple times. If the EFSMA represents a software program with Model B a procedure, FIG. 1A represents the case where the procedure is called from a loop as well as being called directly after Model A.

Figure 1B:
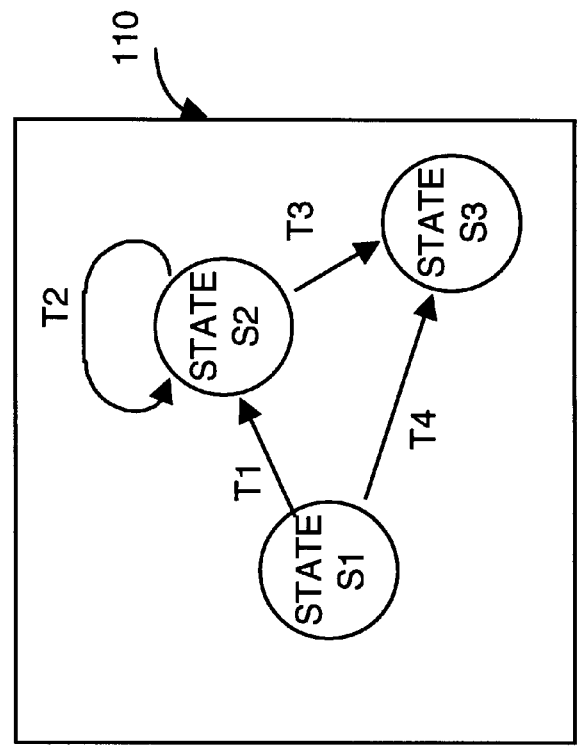
FIG. 1B is a greatly simplified block diagram of one of the models in the extended finite state machine architecture of FIG. 1A.

FIG. 1B shows that each model is made up of numerous states. Though not shown in the simple example of FIG. 1, each model might also include further calls to other models or other transfer of control structures, such as a GO TO statement. FIG. 1B illustrates Model A, which has three states S1, S2 and S3. These three states are joined by four edges T1, T2, T3 and T4. Edge T2 creates a loop such that state S2 within model A might be entered multiple times.

FIG. 1 illustrates that even a simple EFSMA can generate many paths when in all paths mode. The prior art test generation systems allowed the total number of paths generated to be restricted by generating tests with transition coverage mode. In that mode, test generation stops when each edge in the EFSMA is included in at least one test.

According to the invention, a hybrid level of test coverage is possible for the EFSMA to provide more thorough testing than transition coverage but less tests than all paths coverage. A hybrid test coverage is possible by allowing the coverage level of each model to be specified. In a preferred embodiment, the coverage level to be used for each call of a model might be specified. For example, in FIG. 1A, transition coverage might be specified for call 110 of Model A while all paths coverage might be specified for call 116 of model A. Alternatively, a different coverage level might be specified for each model at every call.

The modifications to the prior art test generation system needed to implement a hybrid coverage mode are described below in conjunction with FIG. 2.

While the flexibility to specify the coverage level of each model is highly desirable in tailoring the level of fault detection of the tests generated while controlling the number of tests generated, it can be a very difficult task to determine which coverage level should be assigned to each model. In the case where there are N models in an EFSMA, the number of combinations of coverage levels is $2^N$. An EFSMA representing a software system might typically have between 20 and 50 models. There are literally millions of combinations of coverage levels that are possible.

To make effective use of the flexibility to specify coverage levels on a per model basis, an automated tool, which is called "autobatch," is provided to select a coverage level meeting specified parameters. A user of the autobatch provides an input parameter, called the "deviation," specifying the level of coverage desired. Higher numbers for the deviation will result in more tests and greater coverage. Lower numbers will result in less coverage but fewer tests.

The autobatch uses the deviation to recognize which models in the EFSMA significantly increase the total number of paths generated when set to all paths coverage. These models are identified as "high path producers." Those paths that are not high path producers can be set to all paths coverage. Combinations of the coverage levels of the high path producers can then be generated and the total number of paths for each combination can be determined. The combination generating the highest coverage level while not exceeding the desired maximum number of tests can then be selected from this set. By breaking the problem up in this fashion, the number of coverage level combinations that need to be considered by a human user can be reduced to a manageable level. The autobatch feature of the invention is described below in conjunction with FIG. 4.

Turning now to the details of the implementation, enhancements made to the system described in U.S. Pat. No. 5,394,347 are described. FIG. 2 shows a modification to the model stack frame 210 as discussed in the above mentioned U.S. Pat. No. 5,394,347. These modifications allow the coverage level of each model to be specified. In particular, that patent describes that paths through the EFSMA are traced in a depth first search. As each transition or state is traversed, an entry is pushed on a path stack. As each model is entered in the search, a frame 210 is added to a model stack. The stack frame represents an "instance of the model."

Frame 210 includes a model field 212 which identifies the model. Information describing each model is separately recorded in a database. In addition, frame 210 includes fields 214 which store information about the model or about the instance of the model. Fields 212 and 214 are as described in U.S. Pat. No. 5,394,347

Figure 2:
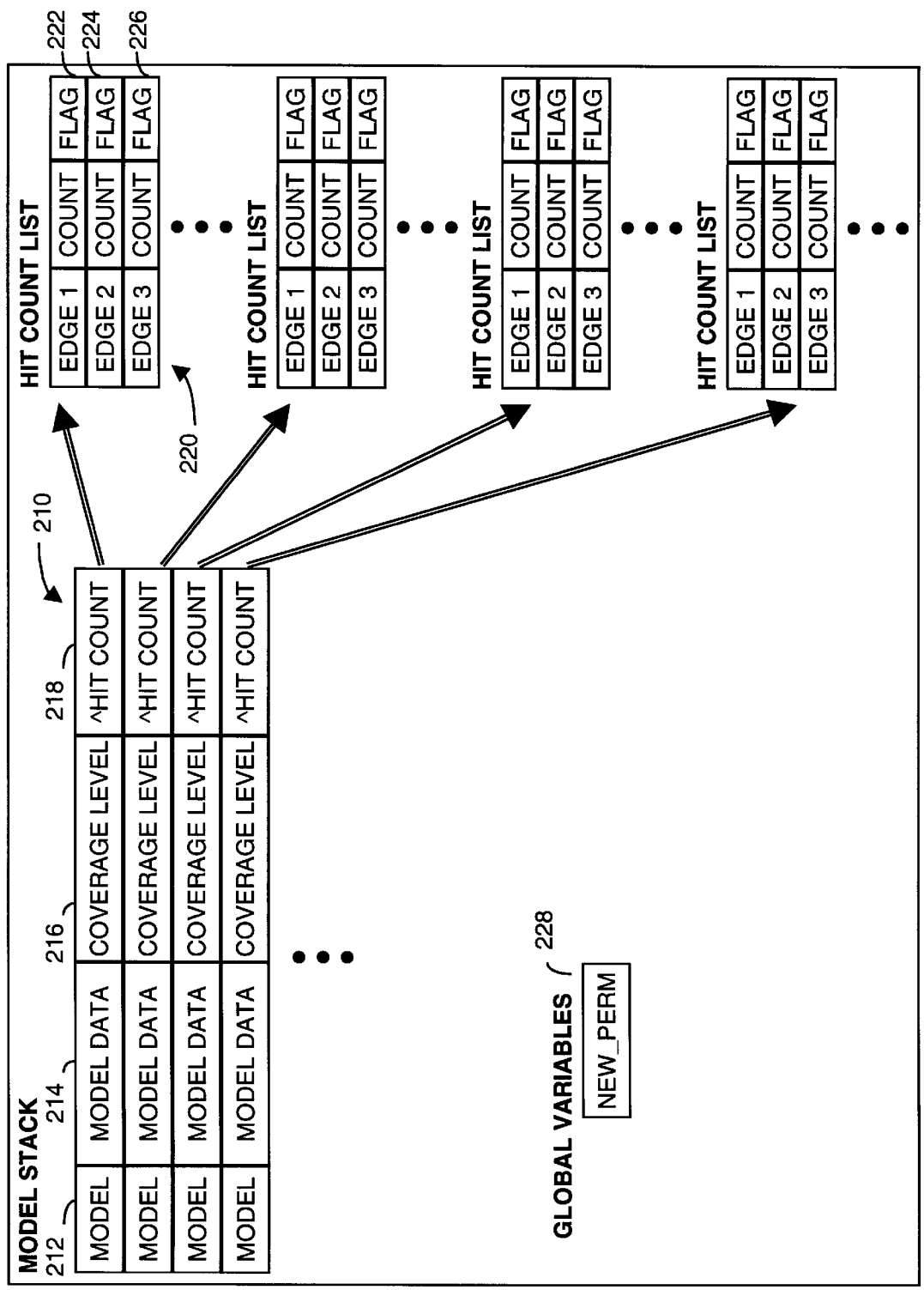
FIG. 2 is a block diagram of a memory structure to implement the invention.

FIG. 2 shows additional fields not described in U.S. Pat. No. 5,394,347. These fields include coverage level field 216 and HIT COUNT list pointer field 218.

Coverage level field 216 stores the coverage level of the model for this instance. In a preferred embodiment, this field takes on a value indicating transition coverage level or an all paths coverage level.

The coverage level value in coverage level field 216 might be set by a user of the test generation system. As described in U.S. Pat. No. 5,394,347, the test generation system is implemented using a computer with a human interface. A human operator provides the inputs which control test generation. The human operator could input a coverage level for each model.

For example, the models of the EFSMA could represent subprograms in a large graphical user interface program. A user might desire a set of tests be generated to verify correct operation of the graphical user interface following modifications of only some of the subprograms. In this scenario, the user might set the models representing the modified subprograms to an all paths coverage level while leaving the other models at a transition coverage level.

Figures 4A, 4B:
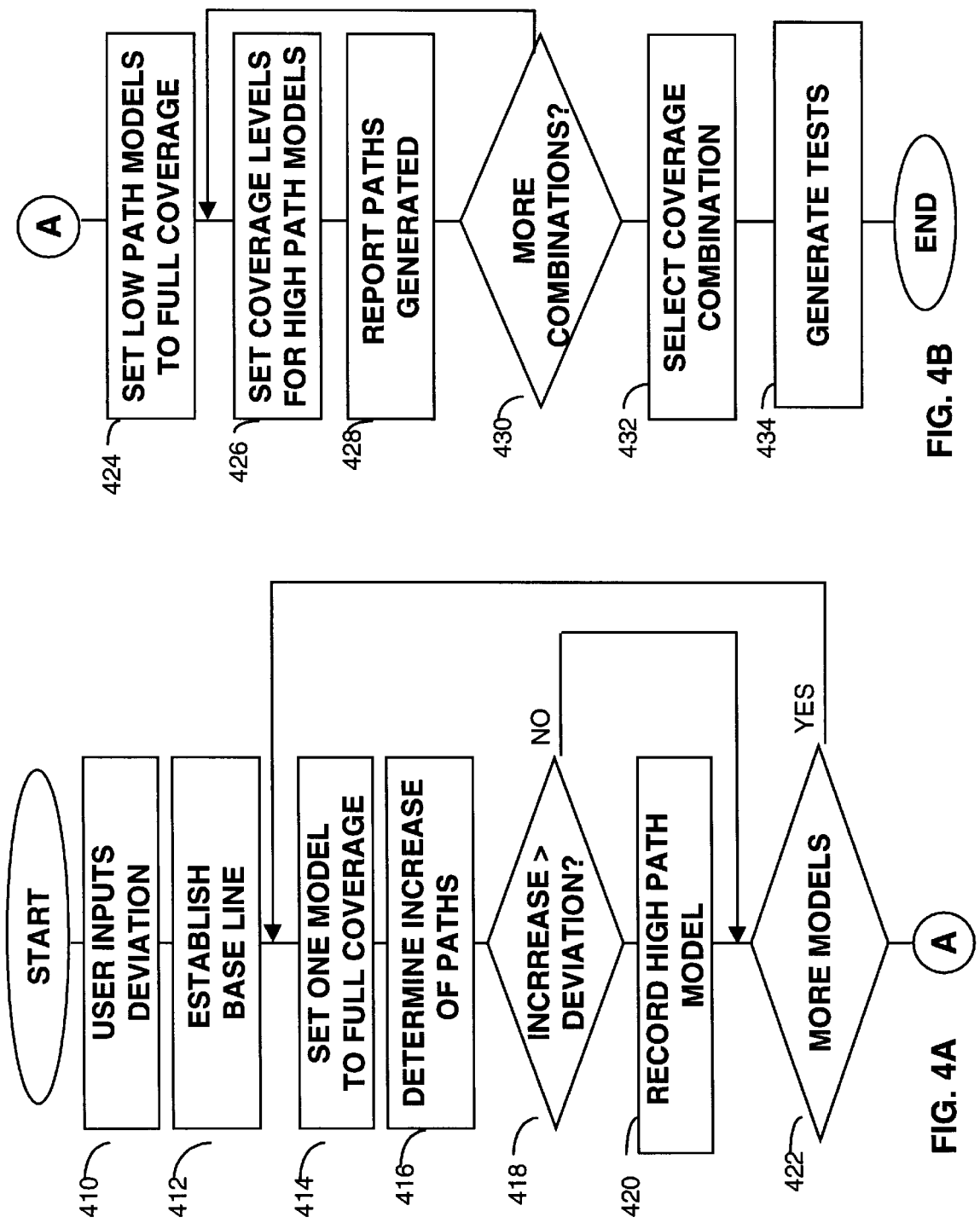
FIG. 4A is a flow chart illustrating the automation method of the invention.
FIG. 4B is a continuation of FIG. 4A.

A second way that the coverage levels might be set is adaptively by the test system. FIG. 4A illustrates the process by which coverage level for each model is determined adaptively. FIG. 4A illustrates the flow of software in the computer which is programmed to automatically generate tests.

Returning to FIG. 2, a preferred embodiment of the memory structure needed for traversing the EFSMA with different coverage levels is illustrated. For each instance of a model, as represented by model stack frame 210, a HIT COUNT list 220 might be established. Such a list might reside in the memory of a computer, such as memory 40 illustrated in FIG. 1 of U.S. Pat. No. 5,394,347. HIT COUNT list pointer 218 is given a value representing the start address of the edge list 220. It will be appreciated that organizing a list in memory requires that some indication of the end of the list or the length of the list also be stored. For clarity, such an indication is not explicitly shown.

HIT COUNT list 220 is only used when the coverage level in field 216 is set to transition coverage. It is used to keep track of whether each edge in the instance of the model represented by the stack frame 210 has been included in a path used to generate a test program. HIT COUNT list 220 is allocated when frame 210 is placed on the model stack. It is deallocated when the frame is removed from the model stack.

If a all paths coverage level is indicated in field 216, then HIT COUNT list 220 is not needed. Various memory allocation techniques are known to cover this situation. For example, no memory might be allocated for field 218 or list 220 when the coverage level field 216 contains a value of ALL PATHS COVERAGE. Alternatively, the HIT COUNT pointer in field 218 might simply indicate a null address so that no memory is allocated for HIT COUNT list 220.

FIG. 2 also shows a global NEW_PERM variable 228 is added to enable the test generation system to implement hybrid coverage. A global variable is a variable that might be accessed at any time during the process of tracing a path through the EFSMA. In contrast, HIT COUNT list 220 is a local, or context sensitive, variable. The list is associated with a record in the model stack frame and is only accessed when that model stack frame is being used.

NEW_PERM variable 228 can be implemented as a specific location in computer memory. It is set as a path is traced forward through the EFSMA. It is checked and cleared once the path has been traced through to the end. If NEW_PERM variable 228 is set, it indicates that the path just traced includes a new permutation of edges in a model set to all paths coverage. FIG. 5 summarizes a prior art method for tracing through the paths in a EFSMA and serves as a basis for explaining how the new data structures of FIG. 2 fit into the path generation process.

FIG. 5 shows a portion of the EFSMA of FIG. 1 drawn out in a tree diagram. States S1, S2, and S3 of call 110 to Model A are shown as nodes of the tree labeled A1, A2, A3. The transitions T1, T2, T3, T4 and T5 are shown as branches interconnecting the nodes. The first state in call 112 to Model B is shown as B1. For simplicity, the other nodes and the edges within call 112 to Model B, call 114 to Model C or call 116 to Model A are not shown. Also, for simplicity, it is shown that edge T2 in Model A is executed only twice. However, because that edge forms a loop it might be executed any number of times, based on the model of the system under test or user supplied constraints.

FIG. 5A shows that there are three paths, Path 1, Path 2, Path 3 and Path 4, through the portion of the tree diagram in FIG. 5A. It will be appreciated that if the rest of the EFSMA of FIG. 1A were included in the tree diagram, Paths 1, 2, 3 and 4 would likely each split into many more paths.

As described in the prior art, paths through the EFSMA are generated by doing a depth first search through the tree structure. The search is kept track of by use of a model stack and a path stack. As each transition is traced out, an indication of that node and transition is pushed onto the path stack. As the path crosses from one model into the next, a new frame is pushed onto the model stack.

FIG. 5B shows path stack 510B as the portion of PATH 1 indicated in FIG. 5A has been traced out. Each entry on the path stack is a pair of values, representing a state and transition from that state. The entries in the path stack indicate that the path was traced in the following order: (A1, T1), (A2, T3), (A3, T5), (B1,X). Model stack 512B shows that the Path 1 goes through Models A and B.

Once a complete path has been generated through the EFSMA, the next path is generated by popping a frame from the path stack and, if the transition popped from the path stack was to the entry state of a model, a frame is popped from the model stack as well. Once a frame is popped from the top of the path stack, the new frame at the top of the stack includes value representing a transition into one of the states in the EFSMA, If there is an "acceptable" transition out of that state, another frame is pushed on the path stack indicating that transition. Items are again pushed on the stack until a complete path has been generated.

Where there is no acceptable transition, another frame is popped from the path stack, leaving a transition to a different state at the top of the path stack. Once again, a check is made of whether there is an acceptable transition out of this state.

Frames are popped from the stack until there is a transition is at the top of the stack that leads to a state from which there is another "acceptable" transition.

Once an "acceptable" transition is reached, items are then pushed onto the stack until a terminal state of the EFSMA is reached. At this point, the path stack contains a new path. The process continues in this fashion, pushing and popping items onto the path stack until, at some point, all the transitions are popped from the path stack without reaching a state that has an "acceptable" transition.

An "acceptable" transition is identified by selecting a transition from that state that has not been used at that point in a path. For example, when state A2 is placed on the stack at point 550, there must be some way to keep track of the two transitions, T3 and T2 from that state. Transition T3 is included in Path 1. When the stack frame represented by point 550 is pushed on the stack, a data structure could be set-up to show that there are transitions T2 and T3 from that state. When Path 1 is traced out, the data structure would be update to show that transition T3 had been taken from point 550. Thus, when the path stack is popped again to point 550, the data structure shows that transition T2 has not been taken from that point.

In this way, all paths are traced out without duplication, of course, if a particular transition violates a user specified constraint, it is not considered "acceptable." Likewise, when the model specifies that only certain transitions are allowed in certain circumstances, a check must be made whether those circumstances exist before a transition is considered acceptable.

FIG. 5C shows the state of the path stack 510C when frames have been popped off until transition T1 is at the top of the stack. Transition T1 points to state T2. Transition T2 leaving state A2 is an acceptable transition. With the path stack as shown in FIG. 5C, more transitions are pushed on the path stack until another path is traced out. FIG. 5D shows path stack 510D and model stack 512D when Path 2 has been traced out.

The next path is made by again popping items off the stack until transition at top of the stack points to a state from which there is another acceptable transition. FIG. 5E shows the top of the stack after it has been popped to a point where there is an acceptable transition. From this state, more items would be pushed on the stack to trace out Path 3. The steps of pushing and popping would be repeated until the entire EFSMA was traced out.

After a path is traced out, it is tested to see if it should be accepted. Acceptance will be different depending on whether all paths or transition coverage was specified. Any new path generated will meet the all paths acceptance criteria because the process of pushing and popping on the path stack always generates a new path. In transition coverage, a check is made as to whether any of the transitions has not been previously included in an accepted path. If there is a new transition, the path is accepted.

Of course, there might be other acceptance criteria applied as well. Path acceptance criteria might be derived from information in the model or user supplied constraints.

Figure 3A:
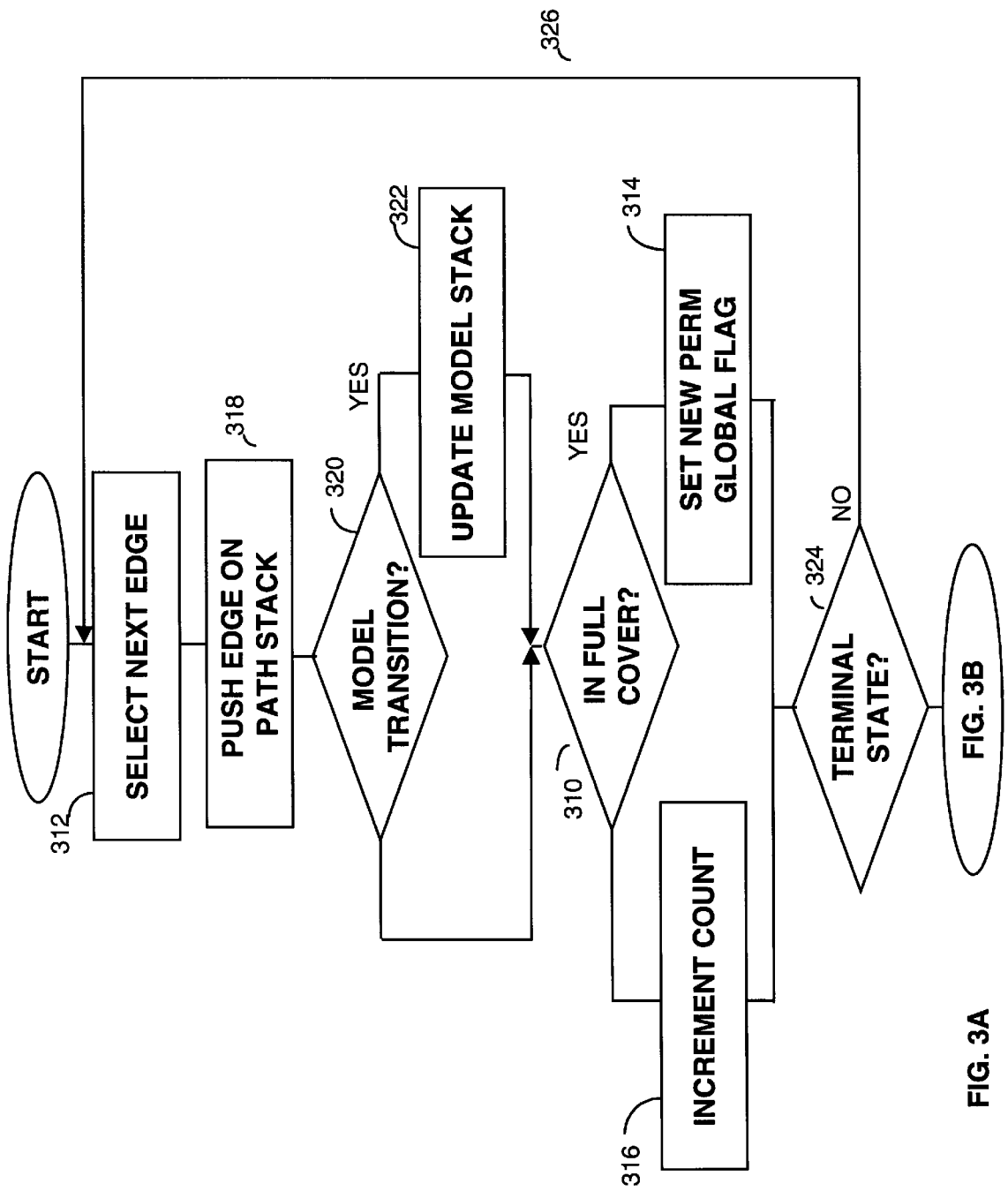
FIG. 3A is a flow chart illustrating a method of constructing a path.
Figure 3B:
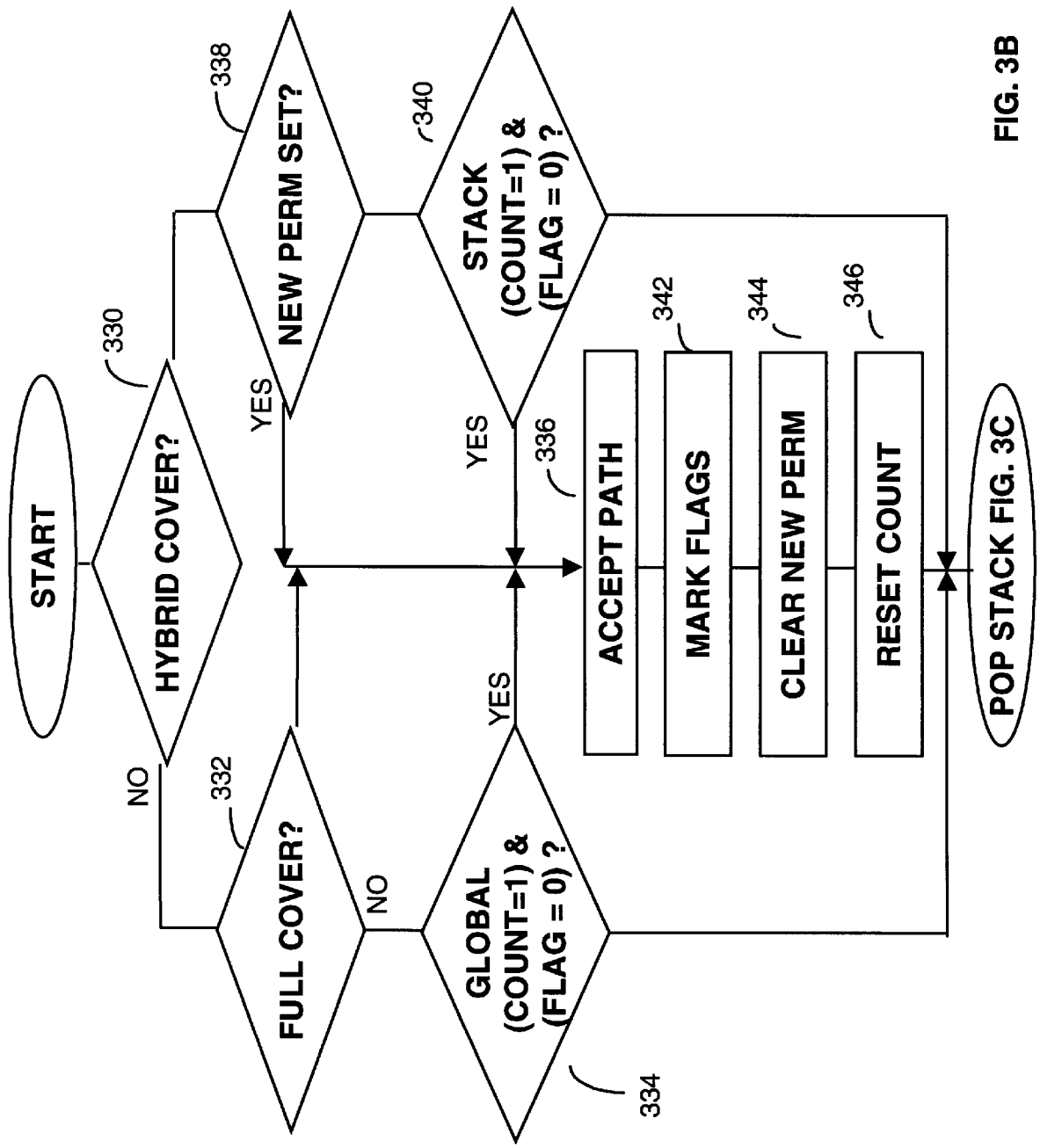
FIG. 3B is a flow chart illustrating a method of determining whether a path should be accepted
Figure 3C:
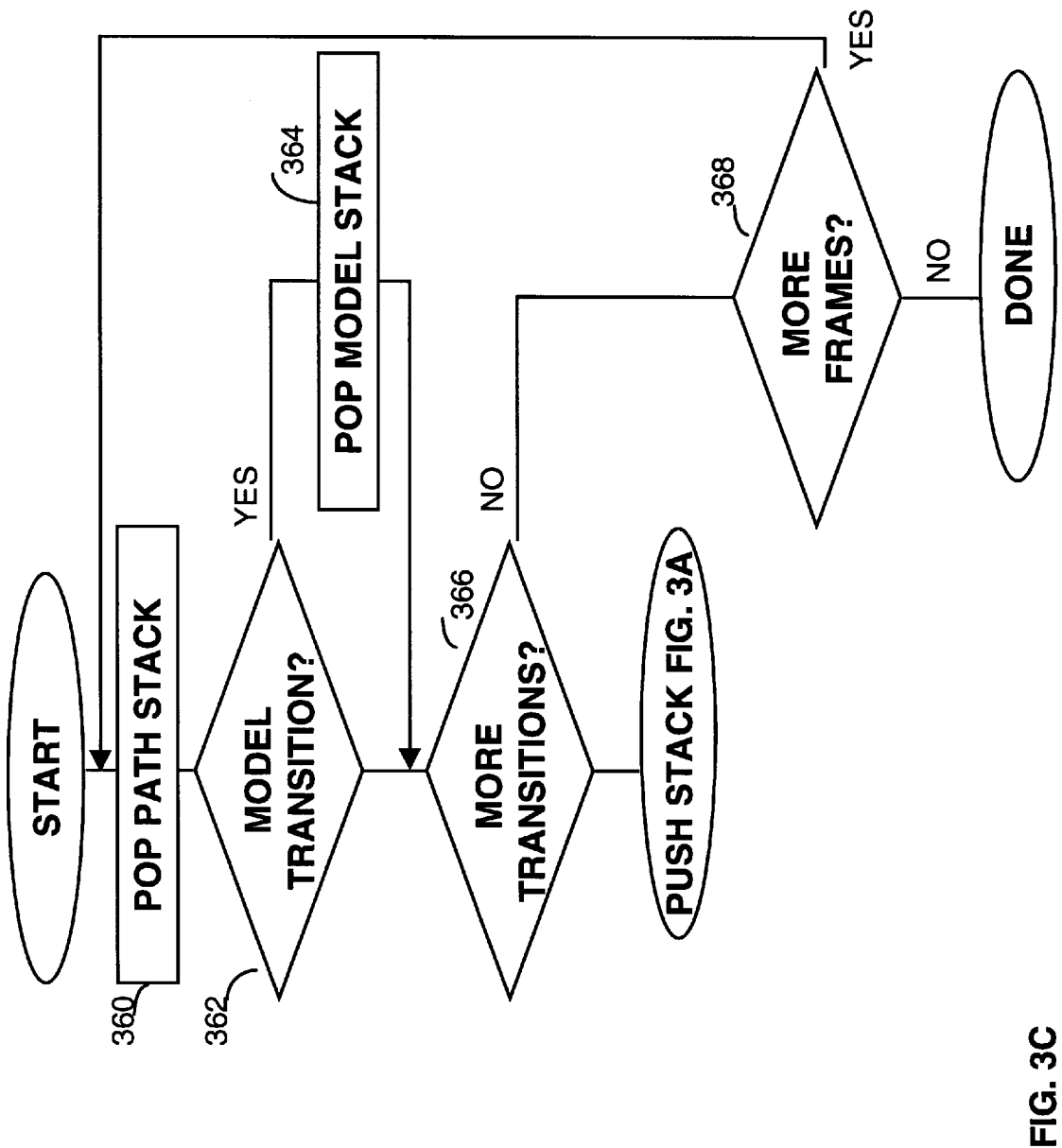
FIG. 3C is a flow chart illustrating a method by which a first path can be converted to a second path.

The process of tracing out paths is similar for the invention. However, various modifications to the process, explained more fully in conjunction with FIGS. 3A to 3C, are required. FIG. 3A shows the process of pushing forward to build a path on the path stack. This process applies when starting at the root of the EFSMA or when pushing forward after popping items off the path stack.

Execution starts at step 312 at which a transition or "edge" is selected from the starting state. In the first pass, the starting state is the root of the EFSMA. In later iterations, the starting state is the state to which the transition at the top of the stack leads.

At step 318, the selected edge is pushed onto the path stack. This step is as in the prior art and could include such other steps as updating a variable stack or other steps.

Also as in the prior art, if the edge pushed onto the path stack is a transition between one model and the next, the model stack is updated. A model transition is identified as in the prior art at step 320. The model stack is also updated similar to the prior art at step 322. However, the revised model stack frame, as shown in FIG. 2, is used. The coverage level associated with the particular model call of the model being entered is filled in field 216. If that coverage level is set to transition coverage, a HIT COUNT list 220 is allocated. That list is initially set to be empty. If, as determined at step 320, there is no model transition, step 322 is skipped.

At step 310, a check is made to determine the coverage level for the currently active model. In the prior art, the coverage level was constant. According to the invention, the coverage level is determined by reading field 216 (FIG. 2) at the top of the model stack. This step allows different coverage levels to be in effect at different places in the EFSMA.

If the coverage level is set to full, execution proceeds to step 314. At step 314, the NEW_PERM flag is set. This flag indicates that a new permutation of edges within a model requiring all paths coverage has been included in the path being built on the stack.

On the other hand, if the coverage level indicated by field 216 is set to transition coverage, execution proceeds to step 316. At step 316 the COUNT field associated with the selected edge in the HIT COUNT LIST at the top of the model stack is incremented. The COUNT value is used later to determine whether an acceptable path has been created.

FIG. 3A does not show the test generator of the invention being operated in a mode in which homogeneous coverage levels are implemented as in the prior art. If a homogeneous coverage level of transition coverage is used, the variable COUNT is not associated with a frame of the model stack. Rather, it is, as in the prior art, in a global data structure and there is only one COUNT variable for each transition in the EFSMA.

Execution then proceeds to step 324. If the edge pushed on the path stack leads to a terminal state, then the path stack contains a complete path and pushing items onto the stack ends at this phase.

However, if the last item pushed onto the stack is not a terminal state, then execution proceeds to step 326 where the next edge is selected. The next edge is selected as in the prior art. The process of selecting new edges is repeated until the a terminal node is reached.

Once a complete path is traced out according to FIG. 3A, the acceptance process of FIG. 3B is performed.

At step 330, a check is made as to whether the program generator is operating in a hybrid coverage mode. If not, execution proceeds to step 332. Processing from this step is very similar to the prior art, which also lacked hybrid coverage.

Step 332 determines whether the entire model is being operated in a all paths coverage mode. If so, execution proceeds to step 336 where the path is accepted. If the entire model is not operated in all paths coverage mode, execution proceeds to step 334.

When execution proceeds to step 334, the entire model is being operated in transition coverage. A path is accepted in transition coverage if some edge in the path stack has not been previously included in a path. This check involves reading each frame on the path stack in turn and correlating that edge to an entry in a global hit count structure. The hit count structure has a COUNT and FLAG field for each edge. If the COUNT is 1 and the FLAG is 0, or cleared, it indicates that the edge has not been used in a previous path. If the COUNT is 1 and the FLAG is 0 for any edge on the path stack, the path is accepted and execution proceeds to step 336.

When operating in hybrid coverage, execution proceeds to step 338. Step 338 checks whether the NEW_PERM variable is set. If so, the path is accepted and execution proceeds to step 336.

If the NEW_PERM flag is not set, a check is made whether there is some edge from some instance of a model which has not been previously included in a path. This check involves reading each frame on the path stack in turn. The edge in the stack frame is correlated to the model stack frame at the top of the model stack when that edge was pushed on the stack. The HIT COUNT LIST associated with that model stack frame is read, to get the correct COUNT and FLAG variables. In this way, each transition in the path stack is matched to the correct COUNT and FLAG variables. If any of the edges has both a COUNT value equal to 1 and a FLAG value equal to 0, then the path is accepted and execution proceeds to step 336.

At step 336 the path is accepted. The actions taken during path acceptance depend on the way the path will be used. The path might be stored in a computer file for later use. Alternatively, it might be converted in to a test program and stored.

In addition, the acceptance step might include application of additional acceptance criteria. For example, constraints might be evaluated before path acceptance.

Once a path has been accepted, execution proceeds to step 342. At step 342, the FLAG variables associated with each edge in that path must be updated to indicate that the edge was used in an accepted path. When operating in hybrid cover, the FLAG variables are those associated with the model stack frame. When not in hybrid mode, the flags are those associated with the global HIT_COUNT data structure.

At step 344, the NEW_PERM flag is cleared. At step 346, the COUNT variables are all reset to zero. When operating in a mode that has the entire model set to transition coverage, the COUNT variables are those in the global HIT_COUNT structure. When operating in a hybrid coverage, the COUNT variables are those associated with the HIT_COUNT structures on the model stack.

Once these variables are reset, some frames are popped off the path stack according to the steps in FIG. 3C. At step 360, the first frame of the path stack is popped.

Step 362 checks whether the transition popped off the path stack was a transition into a new model. If so, execution proceeds to step 364.

At step 364, the top frame is popped from the model stack. The HIT_COUNT list associated with that frame is not longer needed, and it can be also removed.

Then, execution proceeds to step 366. Step 366 checks whether there is another transition from the state which has been popped from the top of the stack. As described above, the path stack includes a mask field, with one entry for each transition leaving the state. This mask field is used to keep track of the transitions leaving a state which have been included in a path at that point in the path. Step 366 reads this mask field to determine whether there are any transitions not marked in the mask field.

If there are more transitions leaving that state, one of those transitions is pushed onto the path stack in accordance with the processing in FIG. 3A. However, when there are no further transitions, execution proceeds to step 368.

Step 368 determines whether there are more frames on the stack. If so, execution loops back to step 360, where the next frame is popped. If there are no further frames on the stack, then all paths through the EFSMA have been traced out and execution terminates.

The processing of FIGS. 3A, 3B and 3C is repeated until all the paths necessary to meet the specified coverage level for each model are generated. The number of paths that are generated will depend on the coverage levels specified for each model. In the preferred embodiment, the coverage levels can be tailored on a per model call basis to provide good coverage without requiring too many test cases.

For example, the invention might be used in a test generator for software programs. Software is generally written in modules, such as functions or procedures. These modules might be used multiple times in the program. Using a hybrid coverage level, one call of each module would be set to a all paths coverage level. Every other call of that module might be set to transition coverage.

With these settings, a subprogram called at many places in the program will have every possible permutation of paths through it tested once. For every other situation in which it is called, each transition in the subprogram will be included in at least one test. However, not all permutations of transitions associated with the other calls will be generated Testing each transition in a subprogram for each situation in which it is called is often highly desirable. In the prior art in which the entire EFSMA was set to transition coverage, each edge was guaranteed to be exercised only once at some point during the EFSMA, not once at every call. In many situations, this difference will be a significant benefit.

EXAMPLE

Many software systems have a FILE subsystem which can be accessed from a menu bar in many different operating modes. The FILE subsystem includes many choices, such as PRINT, DELETE or SAVE. Such a system would be represented by an EFSMA with the FILE subsystem being one model and each choice being a state or submodel within the FILE model.

Each operating mode which might access the FILE subsystem would be represented by an object with a call to the FILE model. For example, the file subsystem might be accessed from what is sometimes called the "desk top" section of the software system. It might alternatively be accessed from a file editor portion of the software system.

In testing the software system, it would be desirable to test every permutation of transitions through the file management system once. For example, the SAVE menu choice might have various states corresponding to different actions to be taken at different times such as: a dialog box asking for a file name; an error state in the event an improper file name is entered; another dialog box in the event a duplicate file name is entered; etc. These states might be entered in any order in actual use of the program and a full test would need to exercise these states in all possible orders, i.e. every possible permutation of transitions between the states.

It is not necessary, and generally not desirable, to generate a full suite of tests with every possible permutation of paths within the FILE subsystem for each operating mode that could call to the FILE subsystem. A test suite would likely be contain too many tests if every possible permutation were generated for access of the file management subsystem from the desk top section, a file editor and every other possible operating mode of the system which could access the file management subsystem. For that reason, the prior art coverage level of all paths coverage will generate too many tests.

On the other hand, it is often desirable for the generated test to do more than test every edge within the file management subsystem just once. It is important to test that the SAVE portions of the file management subsystem work when the subsystem is invoked from a file editor as well as from a desk top portion of the program.

The prior art coverage level setting of "transition cover" would not generate a test of the required thoroughness. For example, if all transitions within the SAVE portion of the FILE subsystem were exercised in a call to the file management subsystem from the desk top, they might not be exercised at all during calls from the file editor. Because the file management subsystem might work differently when called from the file editor than when called from the desk top, the test would be insufficient with an edge cover setting.

We have recognized this deficiency with the prior art. The hybrid coverage scheme according to the invention provides a test coverage which will be very useful to software developers. It can be used to set one call to the FILE management subsystem to all paths coverage. Every other call would be set to transition coverage. With coverage level determined on a model call basis in accordance with the preferred embodiment, the desired test thoroughness will be achieved.

Every permutation through the file management system will be exhaustively tested once. This portion of the test will detect most faults associated with the order of state execution within the file management subsystem. Every transition within the file management subsystem will also be tested for every call. The test would verify that the functions such as PRINT, DELETE or SAVE "basically work" regardless of whether the file management subsystem was called from the desk top, file editor, etc. This check likely requires far fewer tests than a full test of all the permutations. However, the software developer can, in a relatively short time, get information to conclude with a high degree of confidence that the software works.

Such a test might be used during the development process. A final test, with all calls of all models set to all paths coverage, might be run at the very end of the development cycle to increase certainty.

Automated Coverage Level Selection

The above example shows one way that fault coverage might be set manually. In some systems the choice of which models to set to all paths coverage and which to set to transition coverage might not be as apparent. Often, it will be desirable to test as many paths as possible in a set amount of time. As described above, it is often difficult to figure out the number of paths that will be generated with various coverage level settings of various models and model calls. Therefore, one feature of the invention is an automated process for aiding in the selection of coverage levels of each model. The process is shown in FIG. 4.

The process is initiated with user input at step 410. The user specifies a deviation. Higher deviations result in more tests being generated. Lower deviations result in fewer tests being generated. The deviation is selected by the user to control the tradeoff between the time it takes to execute the generated tests and the thoroughness of the testing.

At step 412, a baseline is generated. The baseline represents the number of paths generated with the coverage level of all models set to transition coverage. This step is performed as described above. However, rather than store each path as it is generated, a program variable is simply incremented so that a count of the total number of paths generated is available once the EFSMA has been traversed.

At step 414, the process is repeated but with one model set to the all paths coverage level. Selection of models for all paths coverage can be performed in any order. In a preferred embodiment, a database with one entry for each model is created. The models might be selected simply in the order in which they appear in the database.

At step 416, the increase in the number of paths generated with the selected model set to all paths coverage level is determined. This number is determined by traversing the EFSMA and counting the number of paths generated. The baseline is then subtracted from this count to yield the increase.

At step 418, the increase in the number of paths is compared to the deviation. If the increase exceeds the deviation, the model set to all paths coverage is recorded at step 420 as a high path producer. If the increase is below the deviation, step 420 is skipped and execution proceeds directly to step 422.

At step 422, a check is made whether each model has been set to the all paths coverage level. If more models remain, execution returns to step 414 where a different model is selected to be set to the all paths coverage level. When step 414 is repeated, the models previously set to the all paths coverage level are reset to all edges coverage level.

The loop involving steps 414, 416, 418, 420 and 422 is repeated until no models remain. Then execution proceeds to step 424. The process for automating selection of coverage levels is a two pass process. FIG. 4A shows the first pass during which "high path producing" model calls are identified. The second pass is shown in FIG. 4B. During the second path, certain high path producing model calls are selected for transition coverage.

When step 424 is entered, a record has been made of all models that are identified as high path producers. The remaining models, the low path producers, are set to have a coverage level of all paths coverage. At step 426, the coverage level of the high path producing models are set. Because all combinations of coverage levels for the high path producers are eventually tried, the order in which the combinations of coverage levels are set at step 426 in the first pass are not important.

At step 428, the number of paths through the EFSMA with the coverage levels set at steps 424 and 426 is determined. This number is determined by traversing the EFSMA as described above with the model calls set to the specified coverage levels. The number of paths, along with the specific permutation of coverage levels which generated that number are reported. In the preferred embodiment, these values are reported through a display on a computer screen for a human operator to read.

At step 430, a check is made whether all permutations of coverage levels for the high path generating models have been tried. As stated above, the order in which various permutation are tried is not important, but the permutations are preferably generated in an orderly fashion so that a check can be easily made whether all permutations have been tried.

If more permutations remain to be tried, execution returns to step 426, where a different permutation of coverage levels for the high path generating models is selected.

Once all permutations of coverage levels have been used, the process moves from step 430 to step 432. At step 432, one of the permutations is selected. In a preferred embodiment, the number of tests generated for each permutation of high path producing models is presented to a human user. The human user then selects the desired permutation based on subjective factors. It is important to note that the number of coverage level permutations has been greatly reduced by focusing only on high path producing models. Processing according to the invention has focused the number of choices to a number that a human user can, in most cases, select among.

The selection process at step 432 could also be automated. If a user has specified a maximum usable number of tests, the permutation having the most number of models set to all paths coverage but still generating less than the maximum number of tests might be automatically selected.

The processing of FIG. 4 might also be simplified if the user has input a maximum number of paths in an acceptable test. Step 326 might be modified such that, while processing a specific permutation of fault coverage settings, if the number of permutations exceeded the maximum, processing would stop on that permutation. That permutation would then be rejected as producing too many paths.

Similarly, if a maximum number of paths were specified, and the number of paths generated at step 416 for every model selected at step 414 exceeded the maximum, then it can be known that the second pass will not yield acceptable coverage levels.

Having described one embodiment, numerous alternative embodiments or variations might be made. For example, it is not necessary that the edges associated with each instance of a model be stored in a list pointed to by a field in the model stack frame. Lists or tables of edges might be set up in memory and appropriately labeled so that they can be associated with the required instance of each model.

As another example, it was described that the variable NEW_PERM was a flag. That variable might for example be implemented as a counter. As a new permutation of edges was placed in a path, the counter could be incremented. At the end of the path, if the counter has been incremented over its prior value, it would signify that a new permutation was encountered in that path. The counter could be used in other ways when it is necessary to know the total number of permutations generated. However, if the counter is incremented while tracing out a path that is not used, the counter must then be returned to its prior value once it is determined that the path is not to be used.

Also, it was described that each call of a model had the same coverage level for each instance. Such a limitation is not required. Model data fields 214 in model stack frame 210 could contain a value indicating which instance of the model is currently being executed. Alternatively, the model database could contain a counter field which is incremented for each instance of the model. The coverage level of each model could vary with the instance of the model. For example, the coverage level might be set to all paths coverage for the first instance of a model and transition coverage for subsequent instances. Alternatively, the coverage level might be set to all paths coverage for a subsequent instance of the model.

Also, the preferred application of the invention is in a system for automatically generating tests for software. The invention might also be used in other automatic test generation processes. In addition, it might also be used in other applications in which an item is represented as a EFSMA. For example, it could be used in documentation generation or specification generation as well.

Further, it was described that coverage level was set for each model. The coverage level might be set for any portion of an EFSMA. For example, portions of the EFSMA might be selected which contain loops or contain recursion. In generating tests, it might be desirable to set the coverage level of these portions to transition coverage. Such portions might be a portion of a model or a collection of models.

Also it was described that the deviation level input into the process of FIG. 4A is a fixed number. No such limitation is required. The deviation might be specified as a percentage of the baseline value. Alternatively, the deviation might be determined by a statistical analysis of the impacts of the various models after the impact of using all paths coverage for all of the models has been measured.

Also, though not expressly described, features of the prior art can be used with the invention. For example, constraints can be associated with various edges. As in the prior art, when the constraints were not satisfied, the edge would not be used in a path.

Therefore, the invention should be limited only by the spirit and scope of the appended claims.

What is claimed is:

1. A method of using a digital computer to create a set of paths through a system based on traversal of an extended finite state machine architecture representing the system, the extended finite state machine architecture made up of a plurality of models, the models containing states interconnected by transitions, the extended finite state machine architecture being traversed by making calls to the models and traversing transitions through the models, each call to a model making an instance of that model, the method comprising the steps of:

a) specifying a coverage level for each model call within the extended finite state machine architecture, the coverage levels being at least a first coverage level and a second coverage level, different than the first coverage level;

b) generating a representation of a first path through the extended finite state machine, the representation including an ordered group of transitions, each of such transitions in a model including an association with the model;

c) generating a representation of a second path through the extended finite state machine, the representation including an ordered group of transitions, the ordered group of transitions in the representation of the second path having a prefix portion which matches a prefix portion in the ordered group of transitions in the representation of the first path and a suffix portion which is distinct from the suffix portion in the ordered group of transition in the representation of the first path;

d) accepting the second path by storing a representation of the path in computer memory when the suffix portion contains:

i) a transition associated with a an instance of a model for which the first coverage level has been specified; or ii) a transition associated with an instance of a model for which the second coverage level has been specified when the transition similarly associated with the same instance of the same model call has not been included in an accepted path.

2. The method of claim 1 wherein the first coverage level is all paths coverage level and the second coverage level is a transition coverage level.

3. The method of claim 1 wherein the step of generating a first path through the extended finite state machine comprises pushing path stack frames onto a path stack as the extended finite state machine is traversed, each path stack frame including an indication of a transition between states.

4. The method of claim 3 wherein the step of generating a first path further includes, the step of pushing a model stack frame onto a model stack when a transition represented by the path stack frame pushed onto the path stack is a transition between states in different models.

5. The method of claim 4 wherein each model stack represents an instance of a model and comprises a data structure adapted to store a notation as to whether each edge within the model has been incorporated into a path for that instance of the model.

6. The method of claim 1 wherein steps c) and d) are repeated until all paths through the extended finite state machine are traced out and the step of generating a representation of a second path comprises generating a representation of a path that is distinct from paths that have been previously generated.

7. A method of adaptively controlling the coverage level in the traversal of an extended finite state machine architecture made up of a plurality of models, the models containing states interconnected by transitions, wherein a coverage level can be specified for each model, the method comprising the steps of:
 a) accepeting a deviation value;
 b) determining a baseline number of unique paths through the extended finite state machine with all models set to a first coverage level;
 c) setting the coverage level of a first model to a second coverage level and determining the number of unique paths through the extended finite state machine;
 d) recording that the first model is a high path producing models when the number of paths produced at step c) exceeds the baseline by more than the deviation value;
 e) resetting the coverage level of the first model to the first coverage level and repeating steps c), d) and c) for every model in the extended finite state machine to produce a set of high path producing models.

8. The method of claim 1 wherein the extended finite state machine includes a plurality of calls of a first model and, at the step of specifying a coverage level for each model call, a first portion of the calls of the first model are assigned the first coverage level and a second portion of the calls of the first model are assigned the second coverage level.

9. The method of claim 7 additionally comprising the step of generating a test program by traversing the extended finite state machine with a first portion of the models set to the first coverage level and a second portion of the models set to the second coverage level, with all models identified as high path producing models set to the first coverage level.

10. The method of claim 7 where in the step of setting coverage levels per model includes setting the coverage level per call of each model.

11. The method of claim 1 additionally comprising the step of generating a test set from the set of paths accepted.

12. A method of generating a test set for a system under test, comprising the steps of:
 a) representing the system under test by an extended finite state machine, the extended finite state machine architecture made up of a plurality of models, the models containing states interconnected by transitions, the extended finite state machine architecture being traversed by making calls to the models and traversing transitions through the models, each call to a model making an instance of that model;
 b) assigning one of at least a first coverage level and a second coverage level to each call of a model within the extended finite state machine, with at least one of the models being called at least twice within the extended finite state machine with the first coverage level being assigned to the first call of said model and the second coverage level being assigned to the second call of said model; and
 c) using a digital computer to produce a set of paths through the extended finite state machine in accordance with the coverage levels specified for each model call.

13. The method of claim 12 wherein the step of using a digital computer to produce a set of paths in accordance with the coverage levels specified comprises repeatedly performing the following steps:
 a) generating a possible path;
 b) evaluating the path in a plurality of segments, each segment associated with model calls having the same coverage level;
 c) selecting the path as one of the paths in the test set when any of the segments meets an acceptance criteria defined in accordance with the coverage level for that segment.

14. The method of claim 13 wherein the acceptance criteria involves a check whether an element that would be exercised by a test corresponding to the path would be exercised by a test corresponding to a path previously accepted for the test set.

15. The method of claim 14 wherein the coverage levels are controlflow coverage levels.

* * * * *